(12) United States Patent
Pekala

(10) Patent No.: US 7,211,322 B2
(45) Date of Patent: May 1, 2007

(54) LEAD ACID BATTERY SEPARATOR WITH IMPROVED ELECTRICAL AND MECHANICAL PROPERTIES

(75) Inventor: Richard W. Pekala, Corvallis, OR (US)

(73) Assignee: Entek International LLC, Lebanon, OR (US)

( * ) Notice: Subject to any disclaimer, the term of this patent is extended or adjusted under 35 U.S.C. 154(b) by 0 days.

(21) Appl. No.: 11/341,939

(22) Filed: Jan. 26, 2006

(65) Prior Publication Data

US 2006/0127661 A1 Jun. 15, 2006

Related U.S. Application Data

(63) Continuation of application No. 10/154,937, filed on May 23, 2002, now abandoned.

(60) Provisional application No. 60/293,301, filed on May 23, 2001.

(51) Int. Cl.
*B32B 5/22* (2006.01)
(52) U.S. Cl. ................ 428/317.9; 521/64; 521/62
(58) Field of Classification Search ............ 428/317.9; 521/64, 62
See application file for complete search history.

(56) References Cited

U.S. PATENT DOCUMENTS 4,861,644 A * 8/1989 Young et al. ............ 428/195.1
5,972,471 A * 10/1999 Jasenof et al. ............ 428/141

* cited by examiner

*Primary Examiner*—Hai Vo
(74) *Attorney, Agent, or Firm*—Stoel Rives LLP

(57) ABSTRACT

An oxidation resistant, microporous polyolefin web exhibiting high-strength mechanical and low electrical resistance properties is a solid matrix that includes an ultrahigh molecular weight polyolefin component and a friable precipitated silica component. The ultrahigh molecular weight polyolefin component provides high-strength mechanical properties to the web. The friable precipitated silica component is broken down into predominately discrete silica aggregates dispersed throughout the microporous web to maintain a low electrical resistance in the presence of an electrolyte. In an alternative preferred embodiment, a polyethylene web includes an antioxidant coating that is applied to the separator web following extraction of the majority of the process oils and drying of the extraction fluid from the separator pores. The resultant "sheath" of antioxidant protects the mechanical integrity of the polyethylene separator by suppressing polyethylene degradation.

5 Claims, 2 Drawing Sheets

LEAD ACID BATTERY SEPARATOR WITH IMPROVED ELECTRICAL AND MECHANICAL PROPERTIES

RELATED APPLICATIONS

This application is a continuation of U.S. patent application Ser. No. 10/154,937, filed May 23, 2002, abandoned, which claims benefit of U.S. Provisional Patent Application No. 60/293,301, filed May 23, 2001.

TECHNICAL FIELD

This invention relates to a battery separator for use in a lead acid battery, and in particular, to a separator that includes ultrahigh molecular weight polyolefin and friable precipitated silica components in amounts that simultaneously improve electrical resistivity, oxidation resistance, and puncture resistance.

BACKGROUND OF THE INVENTION

The recombinant cell and the flooded cell are two different types of commercially available lead acid battery designs. Both types include adjacent positive and negative electrodes that are separated from each other by a porous battery separator. The porous separator prevents the adjacent electrodes from coming into physical contact and provides space for an electrolyte to reside. Such separators are formed of materials that are sufficiently porous to permit the electrolyte to reside in the pores of the separator material, thereby permitting ionic current flow between adjacent positive and negative plates.

One type of recombinant battery, a VRLA battery, typically includes an absorptive glass mat (AGM) separator composed of microglass fibers. While AGM separators provide high porosity and uniform electrolyte distribution, they offer little control over the oxygen transport rate or the recombination process. Furthermore, AGM separators exhibit low puncture resistance, which is detrimental to the operation of the VRLA battery in a high vibration environment, such as within an automobile. Low puncture resistance is problematic for two reasons: (1) the incidence of short circuits increases and (2) manufacturing costs are increased because of the fragility of the AGM sheets. One attempt to produce a VRLA battery having improved separator puncture resistance and oxygen recombination entailed the use of a polyethylene separator having a gelled electrolyte design. The battery included a sulfuric acid electrolyte and cross-linked silica particles that formed a three-dimensional gel.

In the second type of lead acid battery, the flooded cell battery, only a small portion of the electrolyte is absorbed into the separator. Flooded cell battery separators typically include porous derivatives of cellulose, polyvinyl chloride, organic rubber, and polyolefins. More specifically, microporous polyethylene separators are commonly used because of their ultrafine pore size, which inhibits dendritic growth while providing low electrical resistance, good oxidation resistance, and excellent flexibility.

Thus most flooded lead acid batteries include polyethylene separators. The term "polyethylene separator" is something of a misnomer because these microporous separators require large amounts of precipitated silica to be sufficiently acid wettable. The volume fraction of precipitated silica and its distribution in the separator generally control its electrical properties, while the volume fraction and orientation of polyethylene in the separator generally control its mechanical properties.

Most types of commercially available precipitated silica are available as powders with the as-received individual particles having diameters in a range of approximately 5–50 micrometers. As shown in FIG. 1, a silica particle 10 is comprised of multiple interconnected silica aggregates 20, each of which has a diameter of about 0.1 to about 0.2 micrometer. Each individual silica aggregate 20 is comprised of multiple covalently bonded primary particles 30, each of which has a diameter of about 20 nanometers.

Silica particles 10 derive their porosity from the interstices between and within silica aggregates 20. The degree of hydrogen and/or covalent bonding between silica aggregates 20 determines the friability of the commercially available precipitated silica. The amount of hydrogen and/or covalent bonding between silica aggregates 20 can be influenced by the precipitation and drying processes used to manufacture the commercially available precipitated silica.

Commercially available precipitated silica is typically combined with a polyolefin, a process oil, and various minor ingredients to form a separator mixture that is extruded at an elevated temperature through a slot die to form an oil-filled sheet. The oil-filled sheet is calendered to its desired thickness and profile, and the majority of the process oil is extracted. The sheet is dried to form a microporous polyolefin separator and is slit into an appropriate width for a specific battery design.

During battery manufacture, the separator is fed to a machine that forms "envelopes" by cutting the separator material and sealing its edges such that an electrode can be inserted to form an electrode package. The electrode packages are stacked such that the separator acts as a physical spacer and an electronic insulator between positive and negative electrodes. An electrolyte is then introduced into the assembled battery to facilitate ionic conduction within the battery.

The primary purposes of the polyolefin contained in the separator are to (1) provide mechanical integrity to the polymer matrix so that the separator can be enveloped at high speeds and (2) to prevent grid wire puncture during battery assembly or operation. Thus, the hydrophobic polyolefin preferably has a molecular weight that provides sufficient molecular chain entanglement to form a microporous web with high puncture resistance. The primary purpose of the hydrophilic silica is to increase the acid wettability of the separator web, thereby lowering the electrical resistivity of the separator. In the absence of silica, the sulfuric acid would not wet the hydrophobic web and ion transport would not occur, resulting in an inoperative battery.

Consequently, the silica component of the separator typically accounts for between about 60% and about 80% by weight of the separator, i.e., the separator has a silica-to-polyethylene weight ratio of between about 2.7:1 and about 3.5:1. One reason a large amount of silica is required is that the silica particles are not completely broken down into their individual aggregates during the extrusion process, thereby providing insufficient silica dispersion throughout the separator web. Increasing the amount of silica in the web relative to the amount of mechanical integrity-stabilizing polyolefin results in low electrical resistance at the expense of puncture resistance.

In response to the commercial demand for increased puncture resistance, some separator manufacturers have attempted to decrease the concentration of silica in the polyethylene separator. However, this undesirably increases the electrical resistance. Further, these separators displayed inadequate acid wettability. One attempt to increase the acid wettability of the low concentration silica separators involved applying a combination hydrophobic/hydrophilic surfactant coating to the web. While the surfactant successfully increased the acid wettability and decreased the electrical resistance of the separator, it complexed with the soluble lead oxides of the battery and degraded to form a black scum that interfered with battery operation. Moreover, the use of a surfactant introduced a significant additional processing expense.

It is therefore desirable to cost-effectively produce a microporous polyethylene separator having a material composition that provides increased puncture resistance and high oxidation resistance while maintaining a low electrical resistance.

A related, but separate, concern involves the addition of an antioxidant to the separator. Antioxidants are added to the polyethylene separator to protect its mechanical integrity by preventing polyethylene degradation during processing and use. These antioxidants are typically added to the separator formulation before extrusion to reduce oxidation and molecular weight reduction of the polymer matrix during the extrusion process. It has been discovered in many cases that most of the added antioxidant material is not present in the separator web following solvent extraction. In fact, only about 20% to about 30% of the initial antioxidant concentration is present in the final separator. Much of this loss occurs during solvent extraction of the process oil from the separator web. In addition, some of the antioxidant is thermally degraded during the extrusion and extraction processes.

It is therefore further desirable to produce a microporous polyethylene battery separator that more efficiently maintains and distributes the antioxidant throughout the web.

SUMMARY OF THE INVENTION

An object of the present invention is to provide a microporous polyethylene web having a material composition that simultaneously improves electrical resistivity, oxidation resistance, and puncture strength. The present invention may be practiced to also retain and distribute antioxidant throughout a microporous polyethylene web.

The present invention is an oxidation resistant, microporous polyolefin web that exhibits high-strength mechanical and low electrical resistance properties. The microporous polyolefin web has a solid matrix that includes an ultrahigh molecular weight polyolefin component, a friable precipitated silica component, and residual process oil that plasticizes the polymer phase. The ultrahigh molecular weight polyolefin component provides high-strength mechanical properties to the web. The friable precipitated silica component is broken down into predominately discrete silica aggregates dispersed throughout the microporous web to maintain a low electrical resistance in the presence of an electrolyte.

The microporous polyethylene web of the present invention formed as a separator has a compositional window bounded by a friable, highly dispersing precipitated silica-to-polyethylene weight ratio that is sufficient to provide increased puncture resistance and high oxidation resistance while maintaining low electrical resistance. The use of a friable, highly dispersing silica enables production of a separator having a silica-to-polyethylene weight ratio of between about 1.8:1 to about 2.7:1. A preferred friable silica component is WB-37™, sold by PPG Industries Inc. of Pittsburgh, Pa. A preferred polyolefin component is ultrahigh molecular weight polyethylene.

In an alternative preferred embodiment, a polyethylene web includes an antioxidant coating that is applied to the separator web. The antioxidant is distributed as a "sheath" around the polyethylene fibrils and webs that constitute the polymer matrix. The antioxidant-impregnated web protects the mechanical integrity of the polyethylene separator by suppressing polyethylene degradation.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 1:
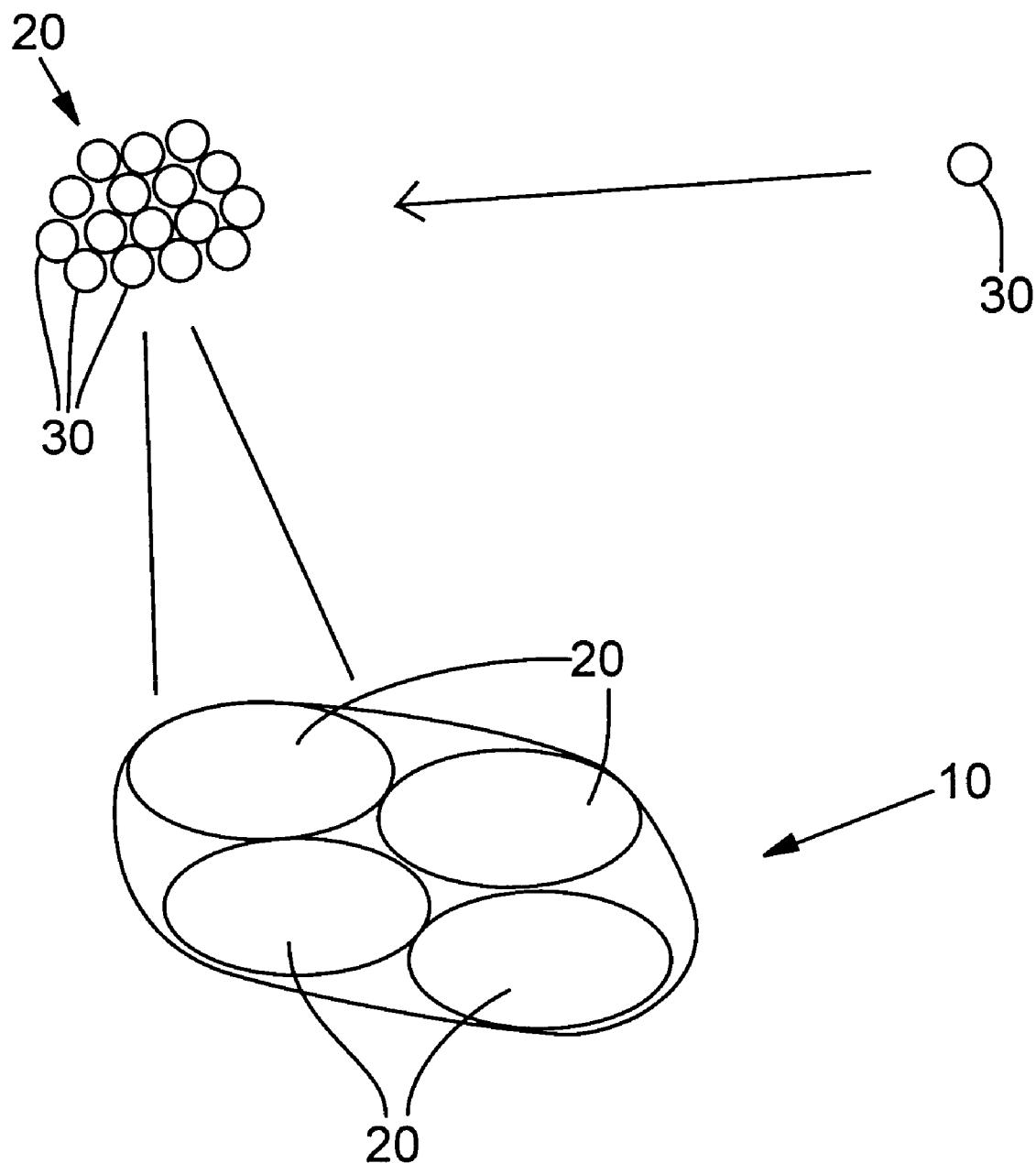
FIG. 1 is a schematic diagram of the three tier structure of precipitated silica showing primary particles, aggregates, and larger as-received particles.

The present invention entails the introduction of a friable, highly dispersing silica into a microporous polyolefin web. Because the bonds between the aggregates of the friable silica are weak, they break during an extrusion process, thereby allowing the silica aggregates to substantially uniformly disperse throughout the matrix. Thus less silica than that used in prior art separators achieves the same level of separator acid wettability and electrical resistance. Consequently, the amount of polyolefin in the matrix can be increased, resulting in increased mechanical integrity, puncture resistance, and oxidation resistance. The use of a friable, highly dispersing silica permits the user to achieve a silica-to-polyolefin weight ratio of between about 1.8:1 and 2.7:1. As used herein, the term "friable" refers to a precipitated silica that is easily broken down into its discrete aggregates under shear forces, such as those imparted by an extruder.

While any friable precipitated silica may be used, a preferred friable silica is WB-37™, manufactured by PPG Industries, Inc. At least three techniques exist for drying precipitated silica: (1) rotary drying; (2) spin-flash drying; and (3) spray drying. A preferred precipitated silica is spray-dried.

Ultrahigh molecular weight polyethylene (UHMWPE) having an intrinsic viscosity of at least 10 deciliters/gram is preferred to form the polyolefin matrix. A viscosity range of about 14–18 deciliters/gram is desirable for the separator of the present invention. While there is no preferred upper limit for the intrinsic viscosity, current commercially available UHMWPEs have an upper intrinsic viscosity limit of about 29 deciliters/gram. The UHMWPE matrix has sufficient porosity to allow liquid electrolyte to rapidly wick through it.

A preferred process oil used during extrusion is one in which UHMWPE dissolves and is a nonevaporative liquid solvent at room temperature. While any extrusion process oil may be used, exemplary process oils include paraffinic oil, naphthenic oil, aromatic oil, or a mixture of two or more such oils. Examples of commercially available process oils include oils sold by Shell Oil Company (such as ShellFlex™ 3681, Gravex™ 41, and Catnex™ 945), oils sold by Chevron Oil Company (such as Chevron 500R), oils sold by Calumet Lubricants Co. (such as Hydrocal™ 800) and oils sold by Lyondell Oil Company (such as Tufflo™ 6056). A processed separator typically contains between about 12 weight percent to about 18 weight percent residual process oil.

Any solvent for extracting the process oil from the separator web may be used in the extraction process. Preferably, the solvent has a boiling point that makes it practical to separate the solvent from the process oil. Exemplary solvents include trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

Exemplary minor ingredients incorporated into the UHMWPE web include antioxidants, colorants, pigments, residual plasticizer or process oil, waxes, lubricants, other polymers, and processing aids.

Example 1 describes the construction of separators in accordance with the present invention, as well as some of its chemical and physical properties.

EXAMPLE 1

UHMWPE (GUR 4150; Ticona LLC) was combined with precipitated silica (WB-37™; PPG Industries, Inc.), process oil, antioxidant, and lubricant in a batch mixer to form a mixture that was subsequently fed to a counter-rotating twin screw extruder operating at a melt temperature of approximately 215° C. Additional process oil was added in-line to bring the final oil content to between about 60 weight percent and about 65 weight percent. The resultant melt was passed through a sheet die into a calender, in which the calender gap was used to control the extrudate thickness. The oil-filled sheet was subsequently extracted with trichloroethylene and dried to form the final separator. The resultant separator material had a silica-to-polyethylene weight ratio of about 2.5:1.

For comparison purposes, a prior art separator was made according to the above-mentioned process, except that the precipitated silica was a rotary-dried precipitated silica (Silica Battery Grade (SBG™); PPG Industries Inc.) that yielded a separator having a silica-to-polyethylene weight ratio of about 2.9:1. The prior art microporous polyethylene separator and the microporous polyethylene separator of the present invention contained the same type of UHMWPE and the same minor ingredients. Both separators had a backweb thickness of 0.15 mm, an overall thickness (backweb thickness plus rib height) of 1.12 mm, and a width of 162.5 mm. Finally, both separators had the same rib design and rib spacing. Table 1 below presents a comparison of the results yielded by the two separators.

TABLE 1

A Comparison of the Battery Separator of the Present Invention and a Prior Art Separator.

| Measured Property | Prior Art Separator | Present Invention Separator | Change (%) |
|---|---|---|---|
| Backweb Puncture Resistance (pounds)† | 1.37 | 1.68 | +22.6 |
| Shoulder Puncture Resistance (pounds)† | 0.79 | 0.92 | +16.5 |
| MD‡ Modulus (ksi) | 15.9 | 17.3 | |
| MD‡ Tensile (psi) | 2381 | 3062 | +28.6 |
| MD† Elongation (%)° | 455 | 475 | |
| XMD‡ Tensile (psi) | 742 | 887 | +19.5 |
| XMD‡ Elongation (%)° | 746 | 887 | |
| Backweb Oil (%)★ | 14.1 | 13.2 | |
| Total Oil (%)★ | 16.0 | 14.9 | |
| Porosity (%) | 55.0 | 52.7 | |
| Boiled ER (milliohms-in²)* | 8.4 | 8.5 | |
| 24 hour ER (milliohms-in²)* | 14.7 | 11.9 | |
| Density (g/cc) | 0.60 | 0.63 | |

*ER = Electrical Resistance is a measure of the amount of electrolyte in the separator pores; measured using BCI Test Method TM-3.218 carried out by a Palico measuring system.
†Measured using BCI Test Method TM-3.214 using an Instron machine.
‡MD = Machine Direction (parallel to the separator ribs);
XMD = Cross Machine Direction (orthogonal to the separator ribs); Measurements were in accordance with the BCI Methods.
★Measured by extraction of the residual oil with trichloroethylene.
°Elongation of the wet strips measured using an Instron machine.

As shown in Table 1, the separator of the present invention exhibits superior tensile and puncture strength while maintaining a lower electrical resistance than that of the prior art separator. The improvement in electrical resistance is especially noteworthy in light of the fact that previous attempts to decrease the silica concentration of the separator resulted in an undesirable increase in electrical resistance.

Figure 2:
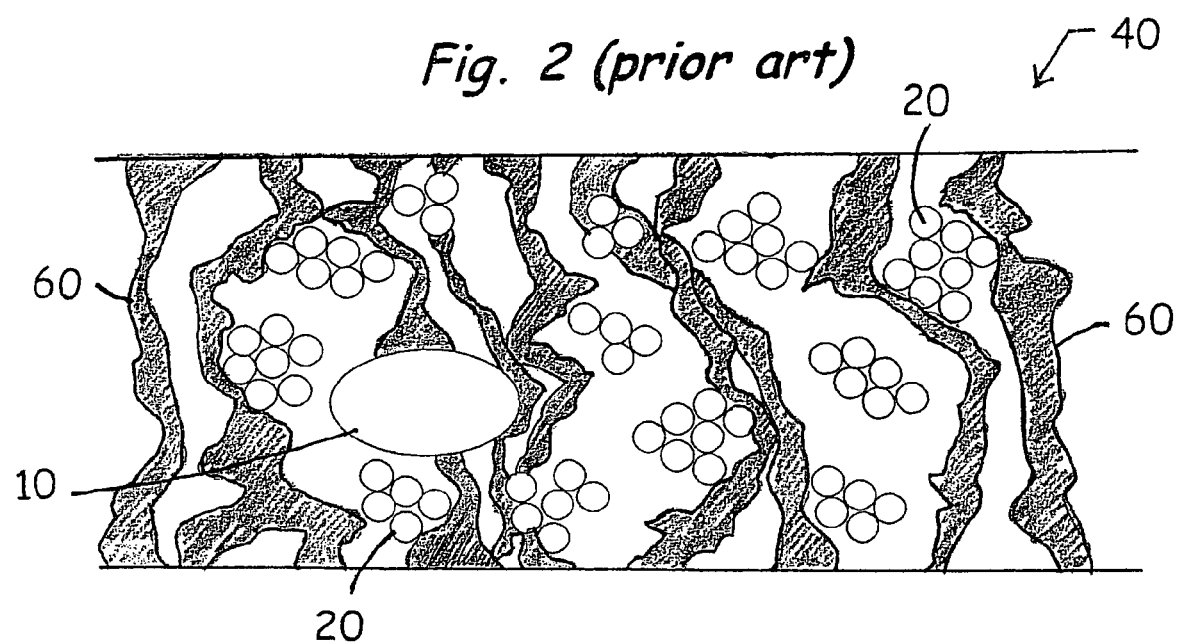
FIG. 2 is a schematic diagram of a prior art separator including undispersed silica particles and silica clusters having multiple interconnected aggregates.
Figure 3:
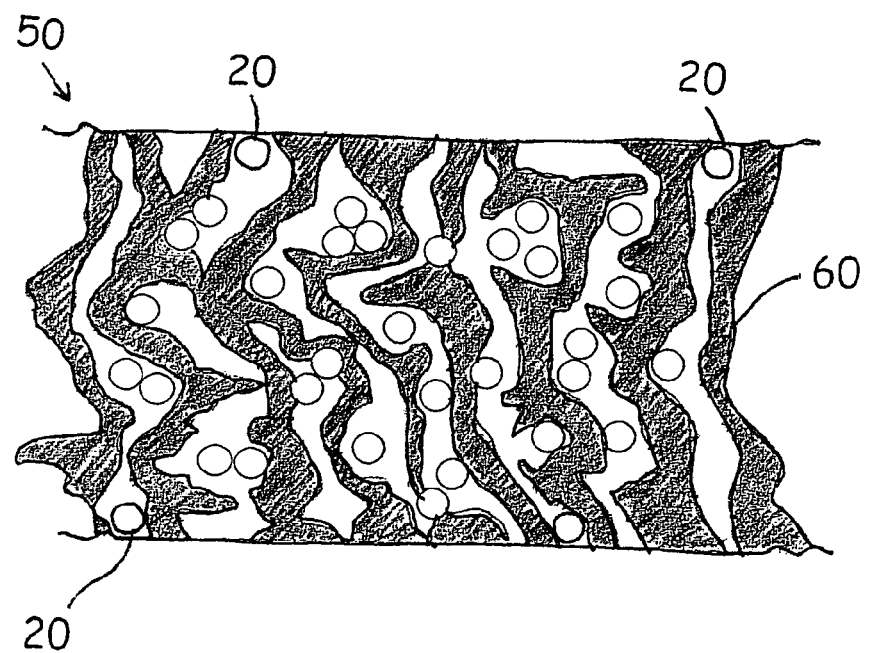
FIG. 3 is a schematic diagram of a separator of the present invention including a majority of discrete silica aggregates substantially uniformly distributed throughout the web.

These improvements result from the use of a friable precipitated silica. As shown in FIGS. 2 and 3, a prior art polyethylene separator 40 includes larger-sized silica particles 10 and clusters of aggregates 20 dispersed throughout a polymer web 60, whereas a separator of the present invention 50 includes predominantly discrete individual porous silica aggregates 20 thoroughly dispersed throughout polymer web 60. Because silica aggregates 20 are smaller than particles 10 and clusters of aggregates 20, less silica is required in the separator composition to provide the same acid wettability and electrical resistance. Consequently, the amount of polyethylene in polymer web 60 can be increased to provide improved puncture resistance.

In an alternative embodiment of the present invention, a coating of an antioxidant material is applied to one or both surfaces of the separator web to protect the mechanical integrity of the polyethylene separator by suppressing polyethylene degradation in an oxidizing environment.

In a first preferred embodiment, the separator is prepared as described in Example 1 and is then re-wet with the antioxidant coating solution. Following application of the coating solution, the separator is dried to remove the solvent from the separator pores while leaving behind the antioxidant. In a second preferred embodiment, the antioxidant coating solution is applied to the separator web after extraction of the process oil but before removal of the solvent from the pores. Following application of the antioxidant coating, the web is placed into a drying oven to facilitate solvent evaporation. The antioxidant coating may be applied to the separator web by any conventional coating method, including brushing, spraying, roller-based application, or immersion.

The antioxidant for use in the present invention may be any antioxidant compatible with ultrahigh molecular weight polyolefins. It is desirable that the antioxidant be soluble in the organic solvent used for extracting the process oil from the separator web but not highly soluble in the sulfuric acid electrolyte. A preferred solvent to extract process oil from the separator web is tricholoroethylene. Exemplary commercially available antioxidants that are soluble in trichloroethylene include Irganox 1010 (tetrakis[methylene(3,5-di-tert-butyl-4-hydroxyhydrocinnamate] methane)), Irgafos 168 (tri-2,4-di-tertbutylphenyl phosphite), Irganox B-215 (a 33:67 weight percent blend of Irganox 1010 and Irgafos 168), Irganox MD 1024 (1,2-bis (3,5-di-tert-butyl-4-hydroxyhydrocinnamoyl) hydrazine), and mixtures thereof, all of which are manufactured by Ciba-Geigy Corp.

Because the separator web is microporous, a portion of the antioxidant coating solution wicks into the interior of the web such that antioxidant is present on the web surface and in the interior of the separator web. For example, more antioxidant may be present on the surface of the web and less antioxidant may be present in the interior of the web. The antioxidant coating solution is preferably of a concentration that provides sufficient wicking into the separator web during application and that provides the desired antioxidation protection for the separator web after drying. For example, when the antioxidant is Irganox 1010 and the extraction solvent is trichlorethylene, a 5–50% (w/v) solution of Irganox 1010 in trichlorethylene is preferred.

Oxidation resistance tests were performed on antioxidant-coated separators as follows: the separator material was cut in the cross-machine direction into 25 mm×125 mm strips that were individually dipped into isopropyl alcohol for fewer than 5 seconds and then rinsed with distilled water. The strips were then mounted in a fixture that was placed in a glass beaker filled with a sulfuric acid/hydrogen peroxide mixture formed by combining 670 ml of $H_2SO_4$ having a specific gravity of 1.28, 80 ml of $H_2SO_4$ having a specific gravity of 1.84, and 250 ml of a 30 weight percent $H_2O_2$ solution. Ten separator strips were placed in a beaker containing 500 ml of the sulfuric acid/hydrogen peroxide mixture. The beaker was placed into an 80° C. water bath for 20 hours, after which the separator strips were removed and thoroughly rinsed with warm water. The elongation of the wet strips was then measured using an Instron machine, and the results were compared to control specimens.

Examples 2 and 3 describe the construction of antioxidant-coated separators in accordance with the present invention, as well as some of their chemical and physical properties.

EXAMPLE 2

A 5 weight percent antioxidant coating solution was formed by dissolving Irganox 1010 (Ciba Specialty Chemicals Corp.; 25 grams) in trichloroethylene (500 ml) in a large glass beaker. The mixture was stirred at room temperature, and a clear solution was formed. Next, an applicator having a soft foam roller was dipped into the antioxidant coating solution and lightly pressed against one side of a 150 mm×300 mm sheet of battery separator (RhinoHide™ HTT; ENTEK International LLC), and a continuous motion was used to apply a coating that penetrated the pores of the battery separator. The trichlorethylene solvent was allowed to evaporate off of the separator in a fume hood, the sheet was turned over, and the antioxidant coating solution was applied to the opposite side of the separator using the above-described procedure.

The antioxidant-coated separator was then cut in the cross-machine direction into 25 mm wide×125 mm long strips, and its oxidation resistance was measured as described above. A comparison of the antioxidant-coated separator and an uncoated separator showed an uncoated separator elongation loss of 26.5% and a coated separator elongation loss of only 18.3%.

EXAMPLE 3

The process and procedures described in Example 2 were used to coat a 150 mm×300 mm sheet of the battery separator of the present invention described in Example 1. The antioxidant-coated separator was then cut in the cross-machine direction into 25 mm wide×125 mm long strips, and its oxidation resistance was measured as described above. A comparison of the antioxidant-coated separator and an uncoated separator showed an uncoated separator elongation loss of 16.8% and a coated separator elongation loss of only 4.8%.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An oxidation resistant, microporous polyolefin web having high-strength mechanical and low electrical resistance properties, comprising:
    a solid matrix including an ultrahigh molecular weight polyolefin component and a friable, highly dispersing, precipitated silica component;
    wherein the ultrahigh molecular weight polyolefin component has a molecular weight that provides sufficient molecular chain entanglement to form a microporous web with high-strength mechanical properties; and
    wherein the silica component is comprised of weakly bonded silica aggregates wherein the bonds between the silica aggregates are broken down in response to shear forces imparted during material processing to form predominately discrete individual porous silica aggregates that are mutually separate from one another and dispersed throughout the microporous web to maintain a low operational electrical resistance in the presence of an electrolyte.

2. The polyolefin web of claim 1, in which the discrete individual porous silica aggregates are substantially uniformly dispersed throughout the microporous web.

3. The polyolefin web of claim 1, in which the precipitated silica and ultrahigh molecular weight polyolefin components define a compositional weight ratio of between about 1.8:1 and about 2.7:1.

4. The polyolefin web of claim 1, in which the ultrahigh molecular weight polyolefin includes ultrahigh molecular weight polyethylene.

5. The polyolefin web of claim 1, further comprising a residual process oil in an amount of between about 12% and about 18%.

* * * * *